United States Patent
Wang et al.

(10) Patent No.: US 6,903,897 B1
(45) Date of Patent: Jun. 7, 2005

(54) PERFORMANCE OF A ROTARY ACTUATOR IN A DISK DRIVE

(75) Inventors: Zhi Wang, San Jose, CA (US); Jenghung Chen, Cupertino, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 165 days.

(21) Appl. No.: 10/607,710

(22) Filed: Jun. 27, 2003

(51) Int. Cl.$^7$ .............................................. G11B 5/596
(52) U.S. Cl. ............................ 360/78.07; 360/78.06; 360/77.02; 318/561; 318/632
(58) Field of Search .......................... 360/78.06, 78.07, 360/78.12, 78.04, 75, 77.02; 318/560, 561, 632, 636

(56) References Cited

U.S. PATENT DOCUMENTS

| | | | |
|---|---|---|---|
| 5,119,250 A | | 6/1992 | Green et al. |
| 5,793,558 A | * | 8/1998 | Codilian et al. ......... 360/78.06 |
| 5,898,286 A | * | 4/1999 | Clare et al. ................. 318/569 |
| 6,781,787 B1 | * | 8/2004 | Codilian et al. ......... 360/78.06 |
| 2004/0001278 A1 | * | 1/2004 | Andress et al. .......... 360/78.06 |

* cited by examiner

Primary Examiner—Andrew L. Sniezek
(74) Attorney, Agent, or Firm—Ramin Mobarhan, Esq.

(57) ABSTRACT

A method for improving the performance of a rotary actuator in a disk drive, the rotary actuator comprises a voice coil motor (VCM) characterized by a torque parameter, the disk drive comprises a servo control system having a motor driver circuit for receiving a series of command effort signals (CEFs) transmitted based on a first seek profile, and for providing an operating current to VCM based on the CEFs for causing a movement of the actuator from a first radial location to a target radial location. The method includes recording the transmitted CEFs, and while actuator is moving: adjusting each recorded CEF to account for a disk drive influence on actuator movement; storing adjusted CEFs; monitoring velocity of moving actuator; calculating an acceleration value corresponding to moving actuator from the stored CEFs and monitored velocity; and adjusting the acceleration value to account for a radial torque parameter variation.

28 Claims, 13 Drawing Sheets

US 6,903,897 B1

PERFORMANCE OF A ROTARY ACTUATOR IN A DISK DRIVE

FIELD OF THE INVENTION

This invention relates to disk drives and, in particular, relates to a disk drive having an actuator controller that adjusts seek current profile on the fly so as to improve seek performance.

BACKGROUND OF THE INVENTION

Hard disk drive storage devices enable computer systems to quickly store data in a non-volatile manner and to retrieve the stored data when needed. The ongoing industry trend is toward computer systems with increased performance, which mandates disk drives with increased data access speeds.

A hard disk drive typically comprises pivotally mounted disks having a magnetic recording layer disposed thereon and a magnetic head elements for affecting and sensing the magnetization states of the recording layer. The recording layer comprises concentric circular tracks with data written to or read from each track by positioning a transducer head over the disk at a corresponding radius while the disk is rotated at a fixed angular speed. The time required to reposition the head is known as the "seek time" of the drive, with a shorter seek time generally translating into shorter data access time.

To position the head over a desired track, a head stack assembly (HSA) is used that includes a pivotally mounted actuator arm that supports the head, a voice coil motor (VCM) for exerting a torque onto the actuator arm, and a servo-controller for controlling the VCM and the movement of the actuator arm by directing a control current to flow through the coil which generates a torque that moves the actuator arm. The direction of the torque is dictated by the direction of control current flow, thus enabling the servo-controller to reposition the head by directing the control current through the VCM to angularly accelerate the actuator arm in a first direction and then reversing the control current to angularly decelerate the actuator arm, typically followed by some additional time for the head to settle on the proper target track. Once the head is on the desired track, a track following current is provided to the VCM in order to maintain tracking.

The current supplied to the VCM during a seek operation typically follows a predetermined profile that includes acceleration and deceleration phases. Currently, these profiles are conservatively configured and implemented so that the values used for maximum acceleration and deceleration values leave ample margins between the values and maximum current that is available for use. One reason for such conservative margins is that the maximum current available for use by the VCM varies with the operating conditions (e.g. temperature, supply voltage), and drive parameters (e.g. FET resistance, VCM winding resistance) of the disk drive, both of which affect how much current can be delivered to the VCM. Additionally, during a seek operation, the servo-controller generally has little or no visibility as to the variations in the VCM motor torque parameter (Kt) which also affects the overall seek process. Thus, if during a seek the head is first accelerated to above a maximum allowed acceleration value dictated by the varying operating conditions, drive parameters and the VCM motor torque parameter of the disk drive, then the deceleration phase may not able to stop the head at the target track. In such a situation, the head overshoots the intended target, and a substantial amount of extra time is then required to bring the head back and settle at the target track. Because of such a negative consequence, the acceleration profiles are generally configured conservatively so that the deceleration phase may have ample reserve of current to prevent overshoot during the seek operation. One disadvantage of utilizing conservative current profiles, however, is that some seek time is sacrificed.

The linear gain variations in the VCM motor torque parameter also affect track-follow operations of the actuator. These variations of the VCM motor torque parameter may cause the servo bandwidth to drift away from the pre-set optimum values, resulting in degradation of the performance of drives by increasing the risk of off-track head position, and could even cause the servo system to become unstable as a whole.

Accordingly, what is needed is a servo system that can improve the performance of the actuator by accounting for the variations in the VCM motor torque parameter.

SUMMARY OF THE INVENTION

This invention can be regarded as a method of improving the performance of a rotary actuator in a disk drive, the rotary actuator comprises a voice coil motor (VCM) characterized by a torque parameter, the disk drive comprises a servo control system having a motor driver circuit for receiving a series of command effort signals transmitted based on a first seek profile, and for providing an operating current to the VCM based on the command effort signals for causing a movement of the actuator from a first radial location to a target radial location.

The method includes recording the series of transmitted command effort signals, and while the actuator is moving: adjusting each recorded command effort signal to account for at least one disk drive influence on the actuator movement; storing the adjusted command effort signals; monitoring the velocity of the moving actuator; calculating an acceleration value corresponding to the moving actuator from the stored command effort signals and the monitored velocity; and adjusting the acceleration value to account for a radial torque parameter variation.

DETAILED DESCRIPTION OF THE INVENTION

Figure 1:
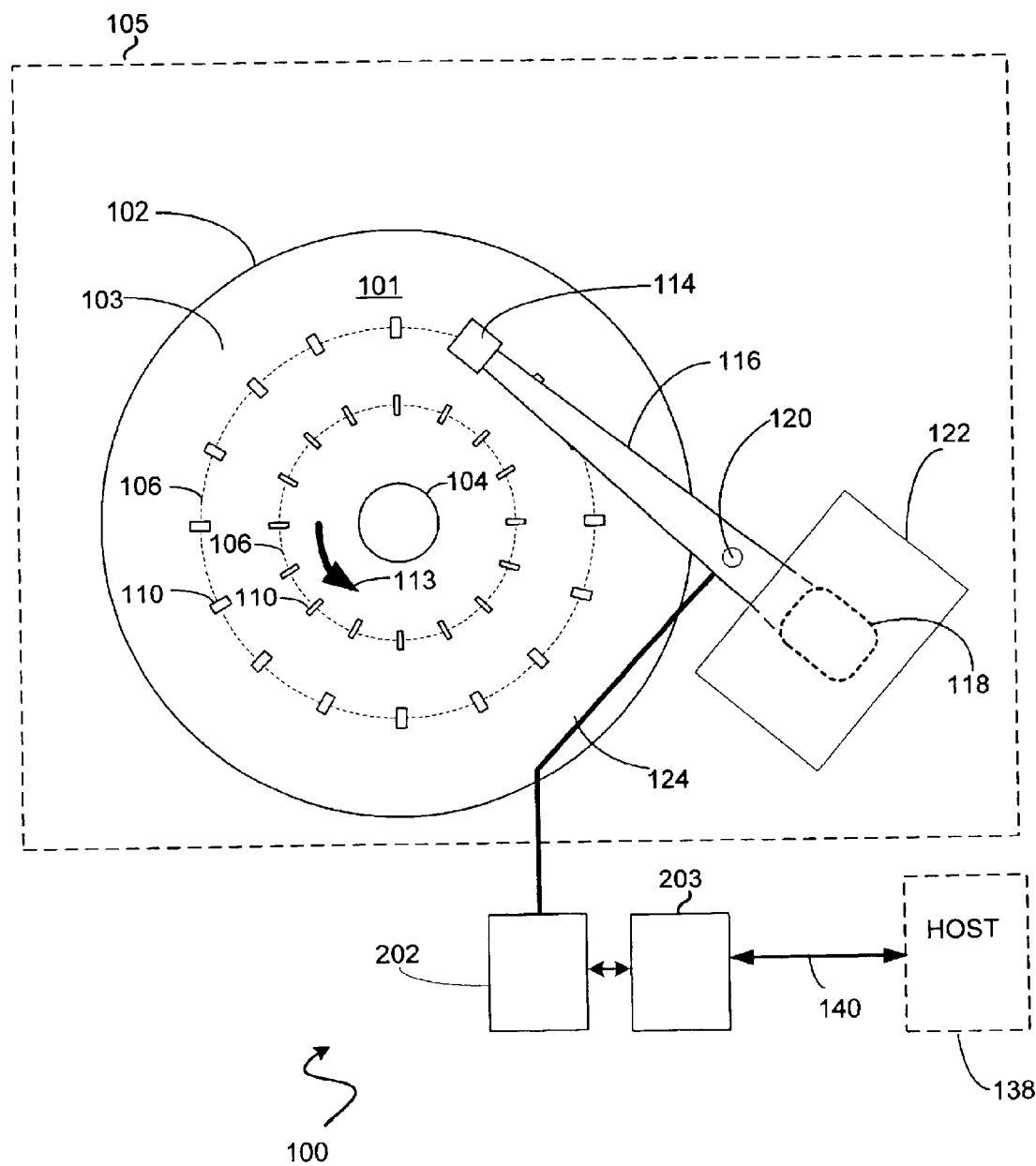
FIG. 1 illustrates an exemplary hard disk drive in which the present invention may be practiced.

With reference to FIG. 1, an exemplary hard disk drive 100 in which the present invention may be practiced is shown. As shown, the hard disk drive 100 includes a head disk assembly (HDA) 105 having one or more disks 102 with a magnetic media 101 formed on each surface 103 of a disk 102. The disks 102 are suitably organized into concentric magnetic domains which include servo tracks 106 defined by servo wedges 110 that are equally spaced from an axis of a spindle 104 about which the disk 102 rotates. The servo wedges 110 on a given track 106 are spaced circumferentially in a periodic manner and provide positional information used by a voice coil motor servo system (not shown) during reading and writing operations, and seeking and settling operations.

The HDA 105 further comprises a transducer head 114 mounted on a rotary actuator 116 that rotates about a pivot 120 via controlled torques applied by a voice coil motor (VCM) 122. A signal bus 124, such as a flex cable, interconnects the HDA 105 to a control system 202 which can control the movement of the actuator 116 in a manner well known in the art. In addition, the control system 202 sends to and receives signals from the head 114 during read and write operations performed on the disk 102. As also shown in FIG. 1 the control system 202 is interconnected to the interface control system 203 which is in turn interconnected to a host computer 138 by a bus 140 for transferring of data between the hard disk drive 100 and the host 138.

While the disk drive 100 is in operation, the disk 102 rotates in an exemplary direction 113 about the axis of the spindle 104 at a substantially fixed angular speed such that the surface 103 of the disk 102 moves relative to the head 114. The head's radial position on the disk 102 is changeable by the rotation of the actuator 116 for positioning of the head 114 over a desired servo track 106. The head's radial and circumferential position on the disk 102 is determined by reading the information contained in the servo wedges 110 in a manner well known in the art. Once the head 114 is positioned on the desired servo track 106 within desirable limits, data can be written to or read from portions of servo tracks 6 located between the servo wedges 110.

FIG. 1 further illustrates a coil 118 located at the end of the actuator 116 opposite from the head 114. As is well known in the art, when a current is passed through the coil 118, the coil forms an electromagnet that interacts with an existing magnetic field from a source such as a permanent magnet. The coil 118 and the permanent magnet are configured such that passing of the current in the coil 118 in one direction causes the actuator 116 to rotate in a first direction. When the current is passed through the coil 118 in the opposite direction, the actuator 116 rotates in a second direction that is substantially opposite from the first direction. In this manner, the head 114 can be moved from one servo track to another servo track in what is referred to as a seek operation. The motion of the head 114 is induced by the current flowing through the VCM 122, wherein the VCM 122 generates a torque that is generally proportional to the magnitude of the current.

Figure 2A:
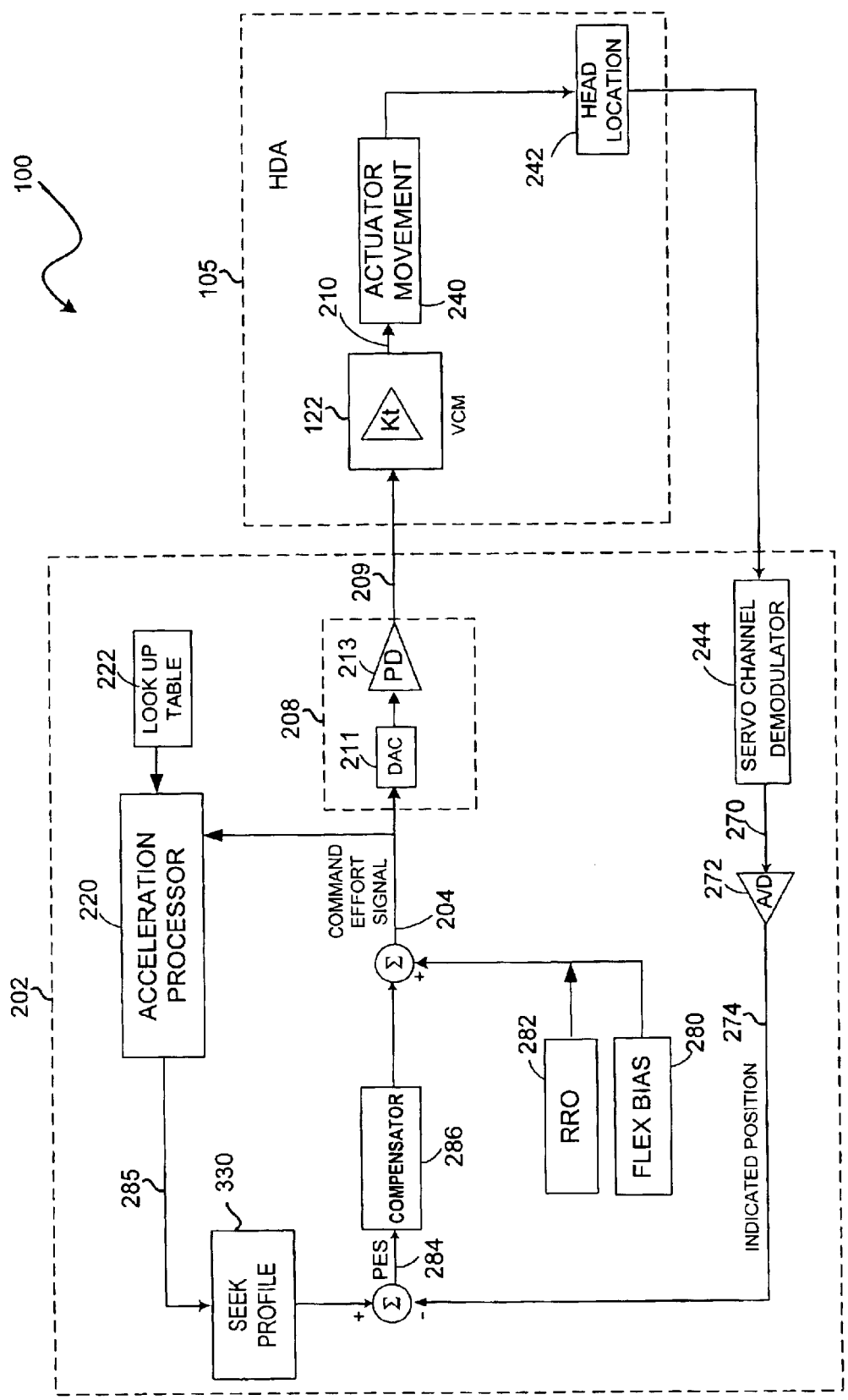
FIGS. 2A–B illustrate diagrams of exemplary servo systems of the disk drive FIG. 1.

FIG. 2A illustrates a diagram of an exemplary servo system 200 in a disk drive 100 in which the method of the present invention for improving the performance of a rotary actuator 116 in a disk drive 100 during a seek operation may be practiced. As shown in FIG. 2A, the rotary actuator 116 (shown in FIG. 1) comprises a voice coil motor (VCM) 122 characterized by a torque output parameter 210. The disk drive 100 further comprises a servo control system 202 having a motor driver circuit 208 for receiving a series of command effort signals 204. Suitably, the motor driver circuit 208 comprises a digital to analog converter (DAC) 211 and a power driver (PD) 213, such as a power driver circuit. The motor driver circuit 208 provides an operating current 209 to the VCM 122 based on the command effort signals 204 for causing an actuator movement 240, which in turn causes a change in head location 242 from a first radial location to a target radial location on the surface 103 of a disk 102. Suitably, the head location 242 is concurrently monitored by a servo channel demodulator 244 which outputs an analog signal 270 corresponding to the head location 242 that is typically converted to a digital signal 274 by an analog to digital converter (ADC) 272. The digital signal 274 corresponds to an indicated track position and off-track percentage value. The digital signal 274 is then combined with a signal corresponding to a seek profile 330 to generate a position error signal 284 that is then generated and fed into the compensator 286 which determines the command effort signals 204. During the seek operations, the compensator 286 functions as a velocity control compensator. The series of command effort signals 204 are then transmitted based on the seek profile 330 as described below and in greater detail in conjunction with FIG. 3A.

Figure 3A:
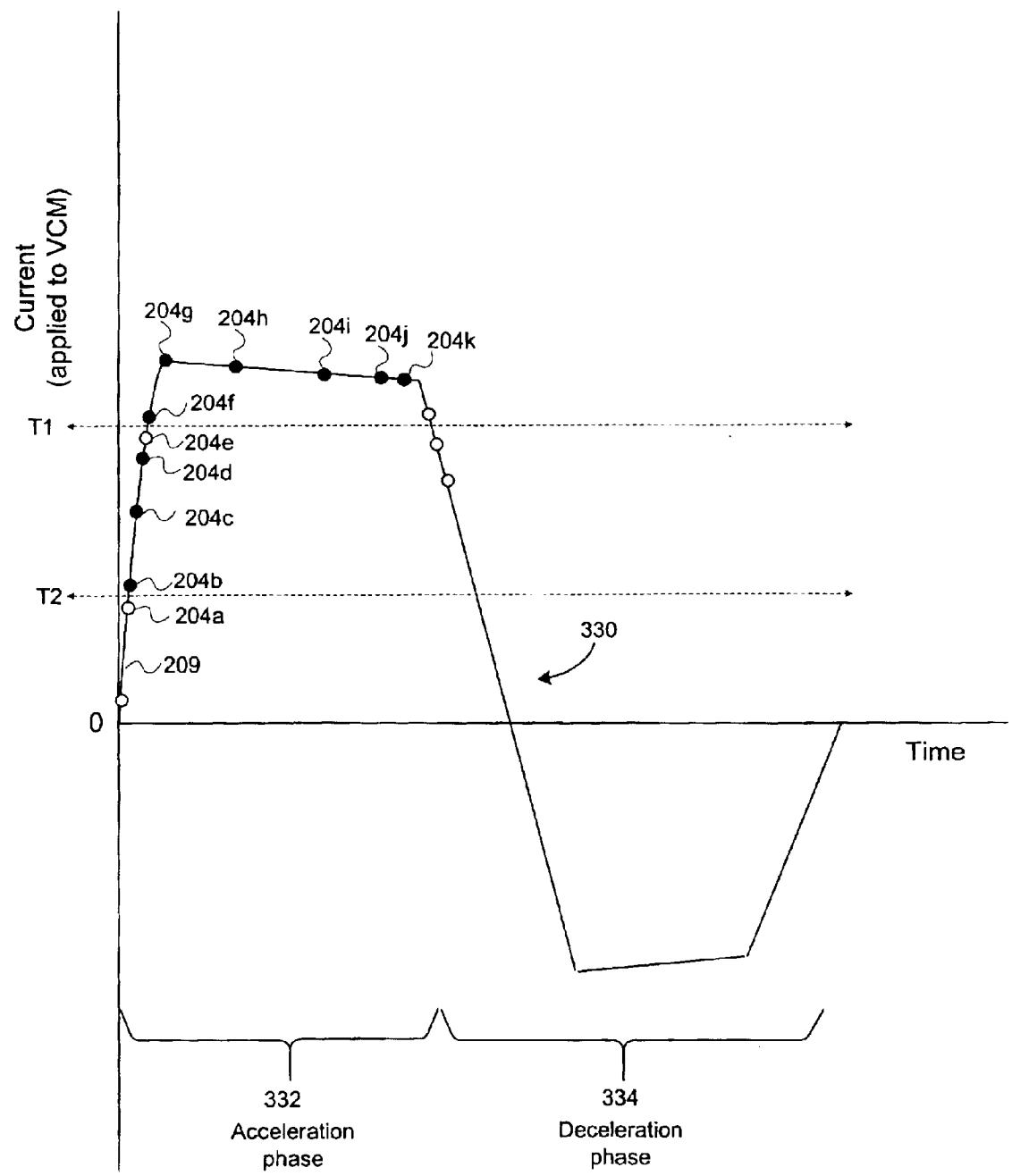
FIGS. 3A–B illustrates exemplary seek current profiles with an acceleration phase followed by a deceleration phase.

FIG. 3A illustrates a seek profile 330 representing the time dependence of the current 209 applied to the VCM 122 during a typical seek operation. As shown, a typical seek operation comprises application of a current 209 that accelerates the head 114 during an acceleration phase 332, followed by application of a reverse current 209 that decelerates the head 114 during a deceleration phase 334. As shown in FIG. 3A, the current 209 is applied based on the transmitted command effort signals 204, symbolically represented by the circles 204a–204k in FIG. 3A. Suitably, the servo control system 202 is configured to suppress disk drive related resonance interferences in the transmitted command effort signals 204, such as by use of a notch-filter. It should be noted that the number and frequency of the circles 204a–204k as shown in FIG. 3A are meant to be exemplary only and the present invention is not limited to the forgoing number of transmitted command effort signals 204.

The magnitude of the current 209 as shown in FIG. 3A depends on factors such as supply voltages, environmental factors (such as temperature), driver variations (such as on-resistance), and actuator variations (such as coil resistance). Thus in certain operating conditions, the available VCM current 209 cannot meet the demanded current by the command effort signal 204. One such condition arises when the command effort signal 204 demands a current that exceeds a saturation level for a given operating condition affected by factors such as those described above. The amount of current which is delivered to the VCM 122 under such condition is called the saturation current. Suitably, the peak acceleration current applied to the VCM 122 corresponds to a saturation current.

Figure 4:
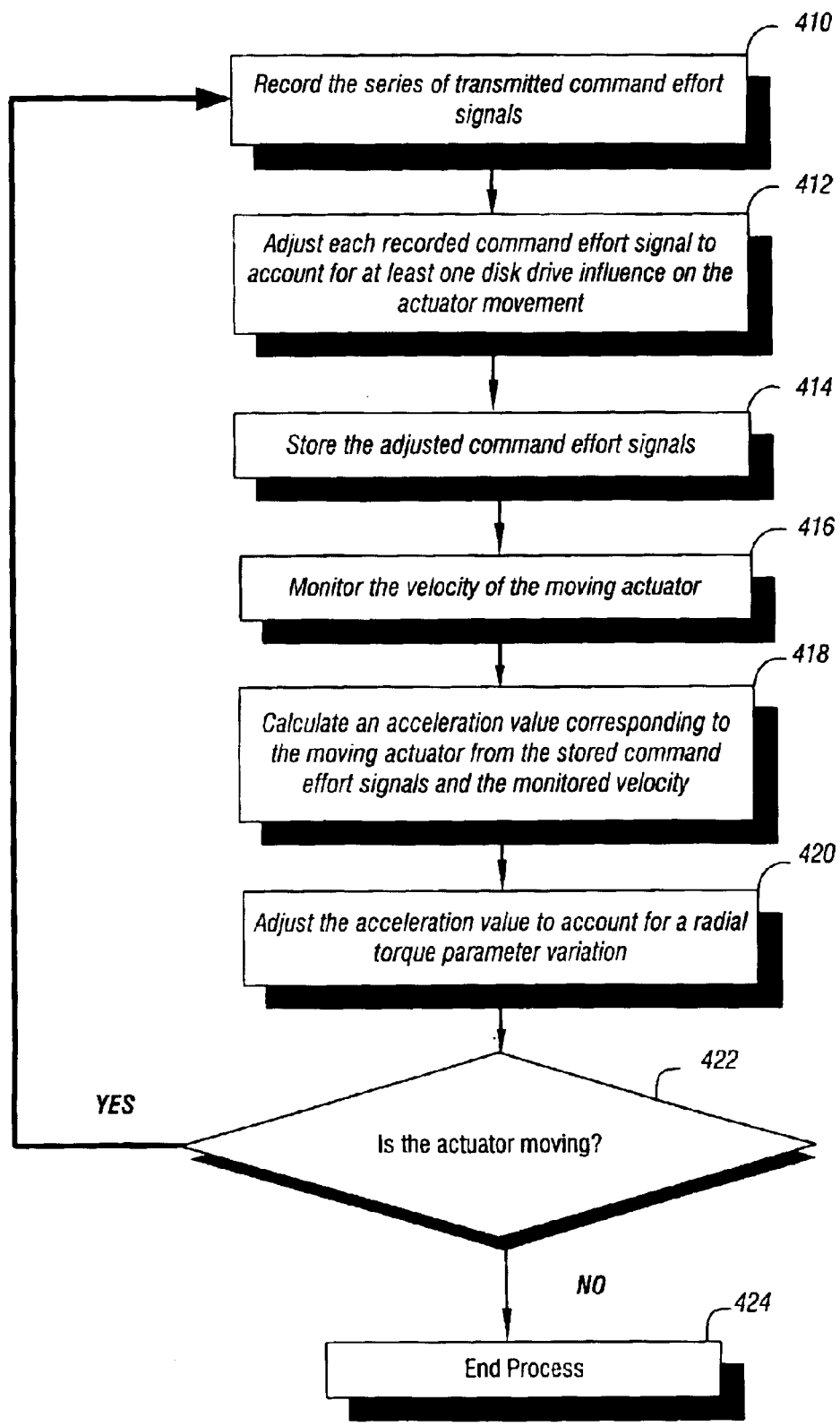
FIG. 4 is a flow chart illustrating a process used in an embodiment of the invention.

FIG. 4 is a flow chart illustrating a process used in an embodiment of the invention. As shown, the process begins in block 410 where the series of transmitted command effort signals 204 are recorded by the acceleration processor 220, as described below and in greater detail in conjunction with FIG. 5. Next, in block 412, each recorded command effort signal is adjusted to account for at least one disk drive influence on the actuator movement, as described below and in greater detail in conjunction with FIGS. 6A–B. Next, in block 414, the adjusted command effort signals are stored, as described below and in greater detail in conjunction with FIG. 7.

The flow in FIG. 4 then proceeds to block 416, in which the velocity of the moving actuator 116 is monitored, as described below and in greater detail in conjunction with FIG. 8. Next, in block 418, an acceleration value corresponding to the moving actuator 116 is calculated from the stored command effort signals and the monitored velocity, as described below and in greater detail in conjunction with FIG. 9. Next, in block 420, the acceleration value is adjusted to account for a radial torque parameter variation as described below and in greater detail in conjunction with FIG. 12. The flow then proceeds to decision block 416, in which it is determined whether the actuator 116 remains in motion. If it is determined that the actuator 116 is in motion, then the flow is returned to block 410 for further recordings of the transmitted command effort signals 204. If in decision block 416 it is determined that the actuator 116 is not in motion, then the flow proceeds to block 424 in which the overall process ends.

Figure 5:
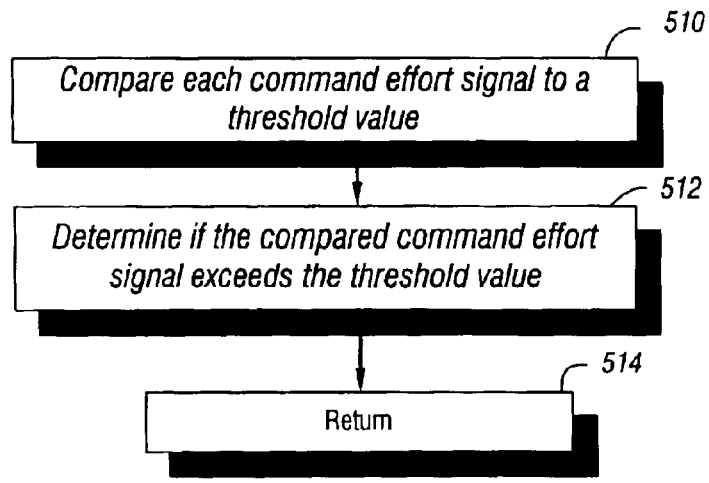
FIGS. 5–10 are flow charts farther illustrating the process used in the embodiment of the invention shown in FIG. 4.

FIG. 5 in conjunction with FIG. 3A, illustrates in greater detail the recording process in block 410 of FIG. 4. As shown, the process begins in block 510 where each recorded command effort signal is compared to a threshold value, such as T1. For seek operations, the threshold value T1 corresponds to an approximate saturation current of the motor driver circuit 208. Next, in block 512, it is determined if the compared command effort signal 204 exceeds the threshold value. In FIG. 3A, for example, it will be determined by comparison that the command effort signals 204 transmitted between command effort signals 204f and 204k exceed the threshold value T1. Next, the process flow then proceeds to block 514 for returning to block 410 of FIG. 4. The overall process flow then proceed to block 412 of FIG. 4 as described above.

Figure 6A:
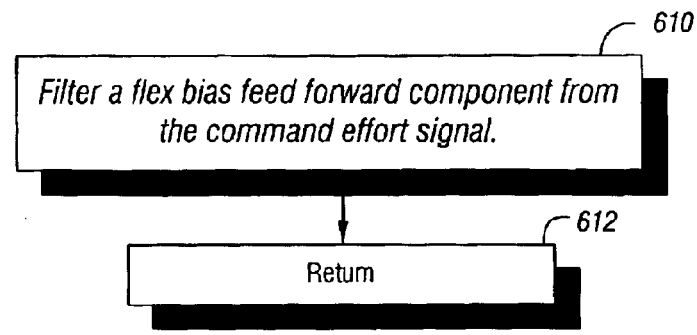
Figure 6B:
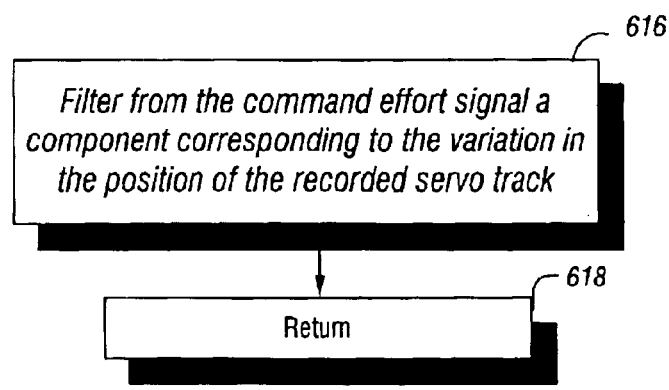

FIGS. 6A–B in conjunction with FIG. 3A, illustrate in greater detail the adjusting process for the recorded command effort signals, introduced in block 412 of FIG. 4. In FIG. 6A, the disk drive influence is caused by a flex bias 280 (shown in FIG. 2A) of a cable 124 connecting the rotary actuator 116 to the servo control system 202. Generally, the flex cable 124 is a spring which coils and uncoils with radial motion of the actuator 116, thus exerting a static flex bias force on the actuator 116, which varies with the radial position of the actuator 116. As shown in FIG. 6A, the process begins in block 610 wherein the flex bias feed forward component is filtered out by the acceleration processor 220 from the command effort signals 204. Next, the process flow then proceeds to block 612 for returning to block 412 of FIG. 4. The overall process flow then proceed to block 414 of FIG. 4 as described above.

In FIG. 6B, the disk drive influence is caused by a variation in the position of a recorded servo track 106, such due to a runout 282 (shown in FIG. 2A) which may result in perceived movement of the rotary actuator 116. As shown in FIG. 6B, the process begins in block 616 wherein the component in the command effort signal 204 corresponding to the variation in the position of the recorded servo track is filtered out by the acceleration processor 220. Next, the process flow then proceeds to block 618 for returning to block 412 of FIG. 4. The overall process flow then proceed to block 414 of FIG. 4 as described above.

Figure 7:
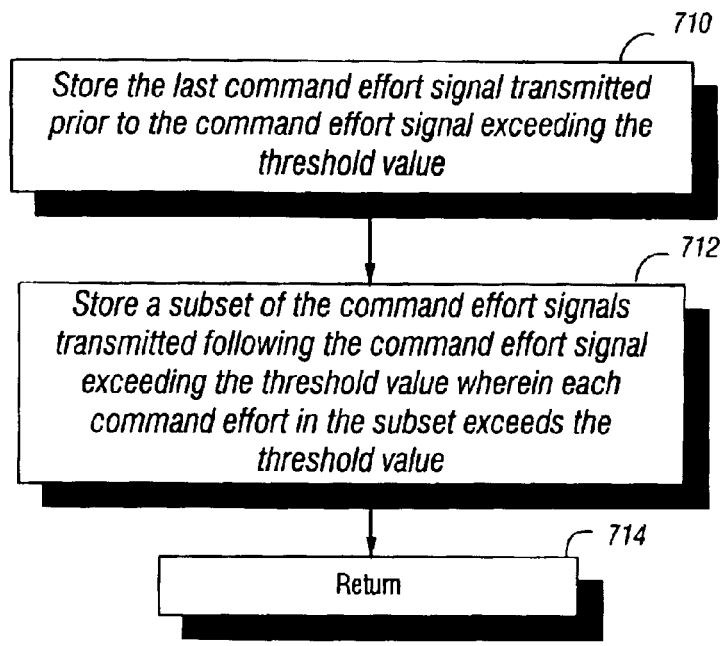

FIG. 7 in conjunction with FIG. 3A, illustrates in greater detail the storing process in block 414 of FIG. 4. As shown, the process begins in block 710 where the last command effort signal 204 transmitted prior to the command effort signal exceeding the threshold value is stored by the acceleration processor 220. In FIG. 3A, for example, command effort signal 204e is the last command effort signal 204 transmitted prior to the command effort signal exceeding the threshold value T1. Next, in block 712, a subset of the command effort signals 204 transmitted following the command effort signal exceeding the threshold value is stored, wherein each command effort in the subset exceeds the threshold value. The subset of command effort signals comprises a predetermined number of command effort signals, suitably six command effort signals for seek operations. In FIG. 3A, an exemplary subset of the command effort signals 204 transmitted following the command effort signal 204e (which exceeded the threshold value T1) comprises the six command effort signals 204f, 204g, 204h, 204i, 204j and 204K, wherein as shown, each of the six command effort signals in the subset exceeds the threshold value T1. Next, the process flow then proceeds to block 714 for returning to block 414 of FIG. 4. The overall process flow then proceed to block 416 of FIG. 4 as described above.

Figure 8:
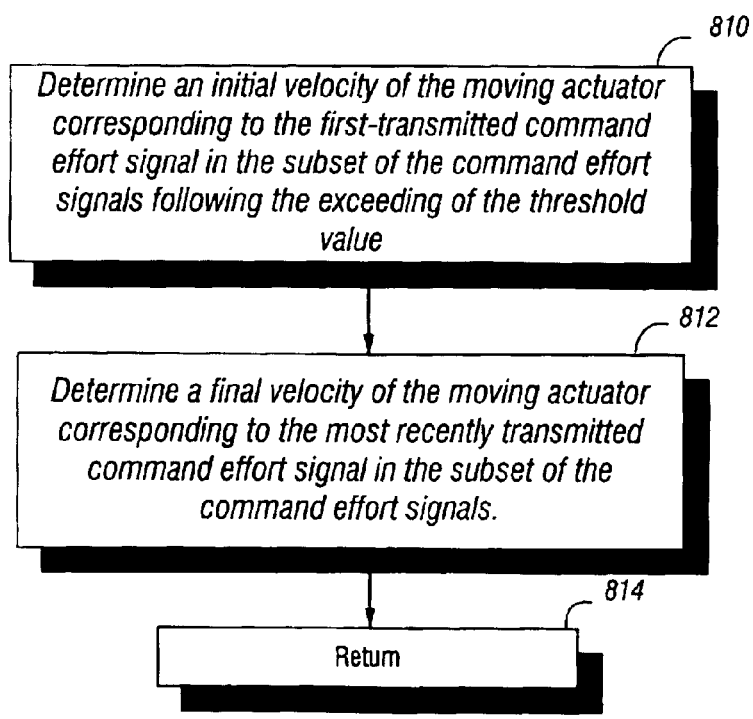

FIG. 8 in conjunction with FIG. 3A, illustrates in greater detail the monitoring process in block 416 of FIG. 4. As shown, the process begins in block 810 where an initial velocity of the moving actuator 116 corresponding to the first-transmitted command effort signal 204 in the subset of the command effort signals following the exceeding of the threshold value is determined by the acceleration processor 220. In FIG. 3A, the first-transmitted command effort signal 204 in the subset of the command effort signals following the exceeding of the threshold value T1 is that of command effort signal 204f. The velocity of the moving actuator 116 corresponding to command effort signal 204f is then determined. Next, in block 812, a final velocity of the moving actuator 116 corresponding to the most recently transmitted command effort signal 204 in the subset of the command effort signals is also determined. In FIG. 3A, the most recently transmitted command effort signal 204 in the subset of the command effort signals is that of command effort signal 204k. The velocity of the moving actuator 116 corresponding to command effort signal 204k is then determined. Next, the process flow then proceeds to block 814 for returning to block 416 of FIG. 4. The overall process flow then proceed to block 418 of FIG. 4 as described above.

Figure 9:
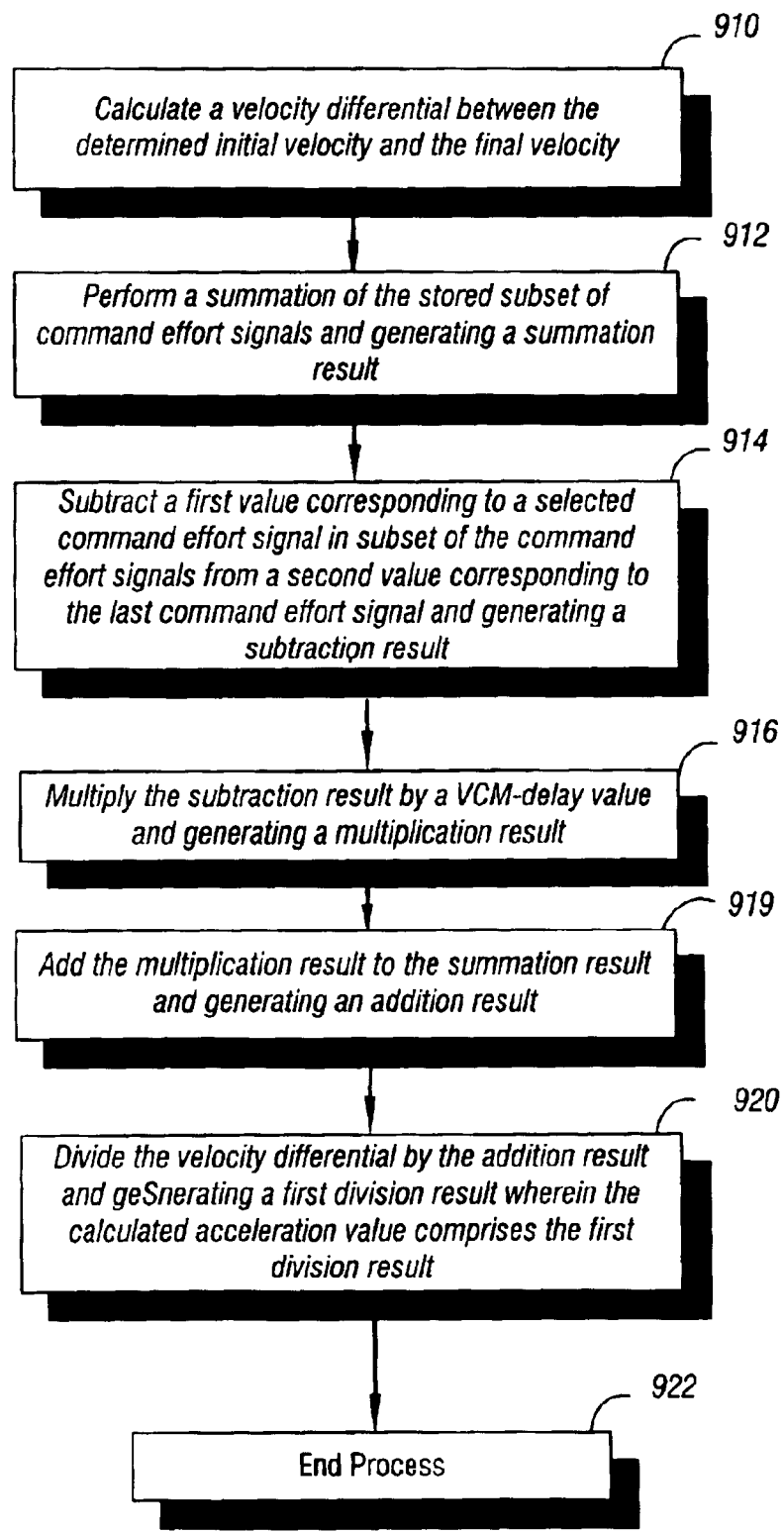

FIG. 9 in conjunction with FIG. 3A, illustrates in greater detail the calculating process in block 418 of FIG. 4. As shown, the process begins in block 910 where a velocity differential between the determined initial velocity and the final velocity is calculated by the acceleration processor 220. In FIG. 3A, the differential is calculated between the velocity of the moving actuator 116 corresponding to command effort signal 204k and the velocity of the moving actuator 116 corresponding to command effort signal 204f. Next, in block 912, a summation of the stored subset of command effort signals is performed and a summation result is generated. Suitably, the summation is performed from the first transmitted command effort signal in the subset till the next to the last transmitted command effort signal. Thus, in the exemplary subset of command effort signals 204f, 204g, 204h, 204i, 204j and 204k shown in FIG. 3A, a summation is performed on the five command effort signals 204f, 204g, 204h, 204i and 204j.

Next, in block 914, a first value corresponding to a selected command effort signal in subset of the command effort signals is subtracted from a second value corresponding to the last command effort signal transmitted prior to the command effort signal exceeding the threshold value and a subtraction result is generated. Suitably, the selected command effort signal is the next to the last transmitted commanded effort signal in the subset. In FIG. 3A, a value corresponding to command effort signal 204j is subtracted from a value corresponding to the previously stored command effort signal 204e. Next, in block 916, a the subtraction result of block 9 is multiplied by 14 a VCM-delay value and a multiplication result is generated. Suitably, the VCM-delay value is a normalized VCM-delay value of 0.5. Next, in block 918, the multiplication result of block 916 is added to the summation result of block 912 and an addition result is generated. Next, in block 920, the velocity differential of block 910 is divided by the addition result of block 918 and a first division result is generated, wherein the calculated acceleration value comprises the first division result.

For ease of illustration, the process of FIG. 9 may be represented by the following exemplary Equation 1:

$$\text{Max}AA = \frac{V(K) - V(k_0)}{\sum_{i=k_o}^{k-1} U(i) + 0.5[U(k_0 - 1) - U(k - 1)]} \quad \text{Equation 1}$$

wherein in the numerator: V(K)–V(ko) represents calculating a velocity differential between the determined initial velocity (i.e. V(ko)) and the final velocity (i.e. V(K)); wherein in the dominator: 0.5 [U(ko–1)–U(k–1)] represents subtracting the first value corresponding to a selected command effort signal in subset of the command effort signals (i.e. U(k–1)), from the last command effort signal transmitted prior to the command effort signal exceeding the threshold value (i.e. U(ko–1)), with the subtraction result multiplied by a normalized VCM-delay value of 0.5; wherein ΣU(i) represents the summation performed on the subset from the first transmitted command effort signal in the subset (i.e. U(ko)) till the next to the last transmitted commanded effort signal (i.e. U(k–1)) in the subset; and wherein MaxAA represents the calculated acceleration value. It should be noted that the sequence of mathematical operations as shown in FIG. 9 and illustrated in the provided Equation 1 is meant to be exemplary only and any rearrangement of the foregoing sequence of the mathematical operations which results in the calculation of an acceleration value is contemplated to be within the scope of the present invention.

As shown in FIG. 3A the movement of the actuator 116 comprises an acceleration phase 332 followed by a deceleration phase 334. Suitably, the calculating process of FIG. 9 occurs during the acceleration phase 332. Returning to FIG. 9, the process flow then proceeds to block 922 for returning to block 418 of FIG. 4. The overall process flow then proceed to block 420 of FIG. 4 as described above.

Figure 10:
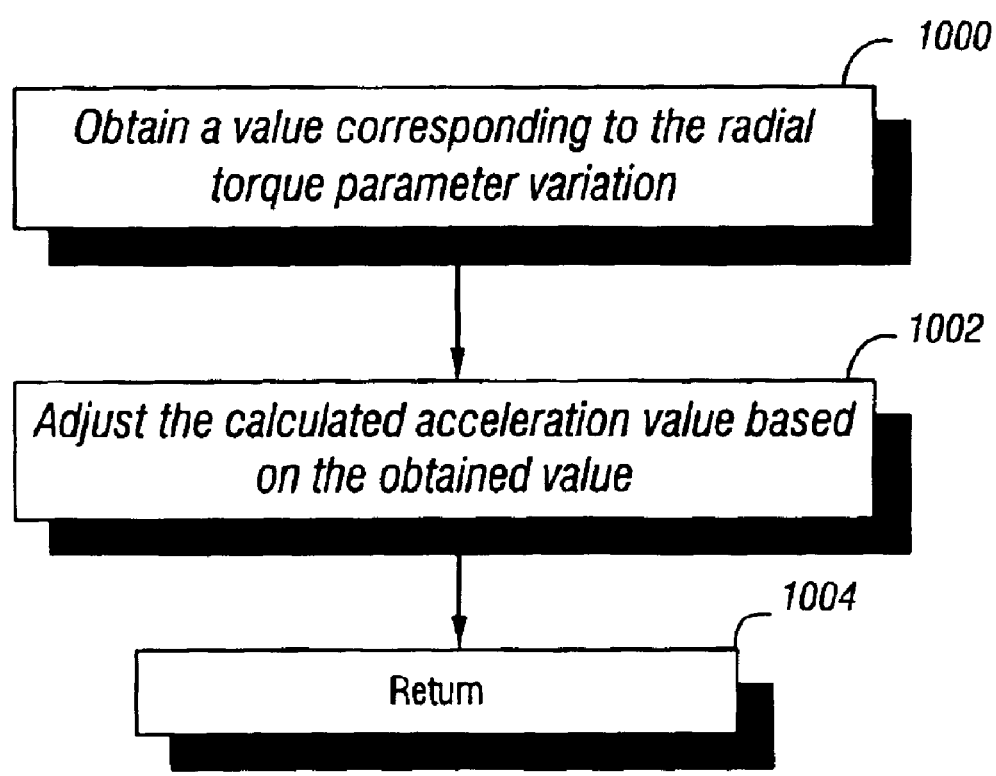

FIG. 10 in conjunction with FIG. 3A, illustrates in greater detail the adjusting calculated acceleration value process, as introduced in block 420 of FIG. 4. As shown, the process begins in block 1000 where a value corresponding to the radial torque parameter variations of the VCM 122 is obtained by the acceleration processor 220, suitably from a look up table 222 (shown in FIG. 2A). The radial torque parameter variations of the VCM 122 comprises the variations in the motor torque parameter (Kt) based on the radial position of the actual on the disk surface 103. Next, in block 1002, the calculated acceleration value is adjusted based on the obtained value, such as by multiplying the acceleration value by the obtained value, to reflect the deviations in the motor torque parameter from a nominal motor torque parameter. The process flow then proceeds to block 1004 for returning to block 420 of FIG. 4. The overall process flow then proceed to block 422 of FIG. 4 as described above.

Figure 11A:
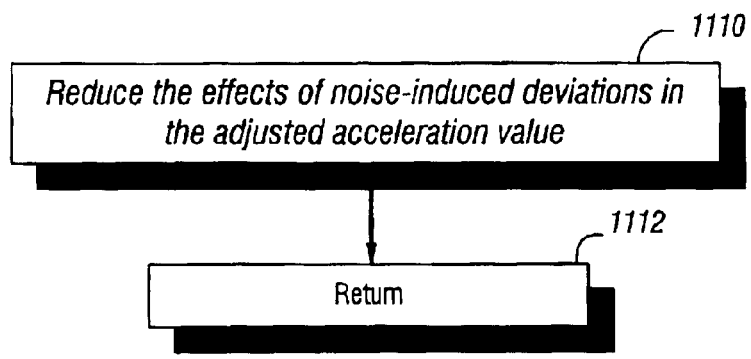
FIGS. 11A–13B are flow charts illustrating other processes used in the embodiment of the invention shown in FIG. 4.
Figure 11B:
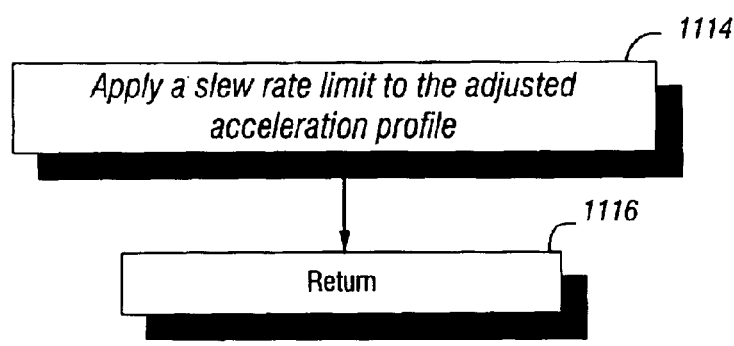
Figure 11C:
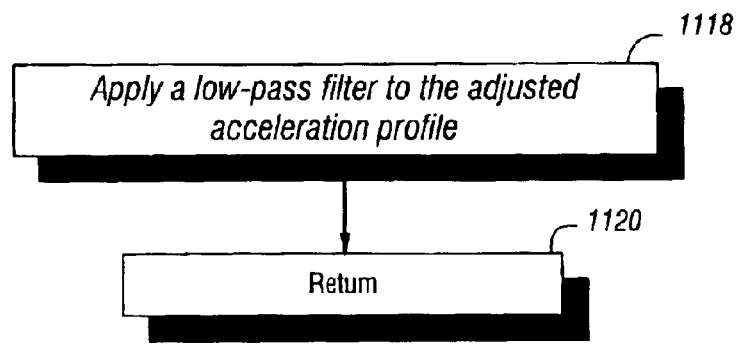

FIG. 11A in conjunction with FIG. 3A, illustrates another process used in the embodiment of the invention shown in FIG. 4. As shown, the process begins in block 1110 where the effects of noise-induced deviations in the adjusted acceleration value are reduced, as shown in greater detail in conjunction with FIGS. 11B and 11C. As shown in block 1114 of FIG. 11B, the effects of noise-induced deviations in the adjusted acceleration value are reduced by applying a slew rate limit to the adjusted acceleration profile. The process flow then proceeds to block 1116 for returning to block 1110 of FIG. 11A. As shown in block 1118 of FIG. 11C the effects of noise-induced deviations in the adjusted acceleration value may also be reduced by applying a low-pass filter to the adjusted acceleration profile. The process flow then proceeds to block 1120 for returning to block 1110 of FIG. 11A.

Figure 3B:
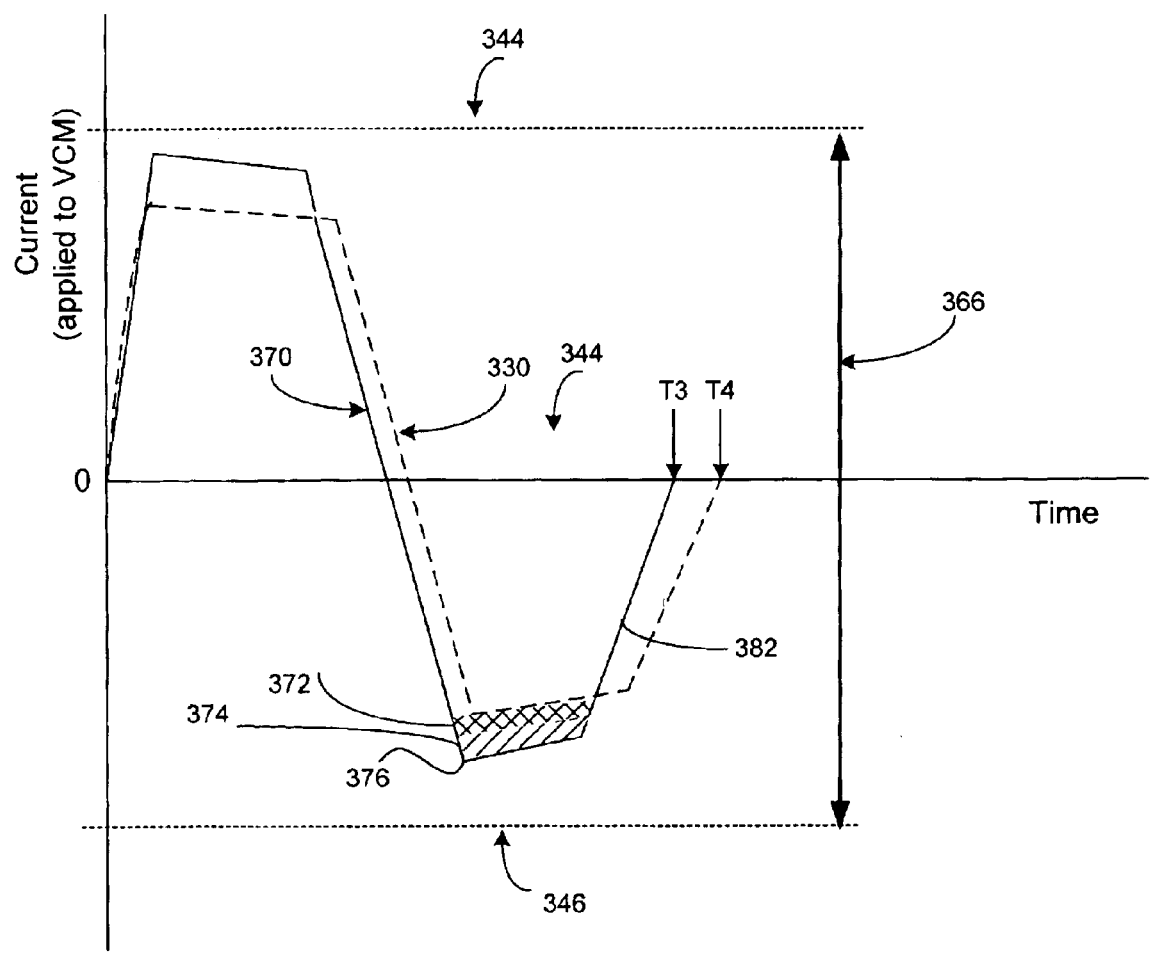
Figure 12A:
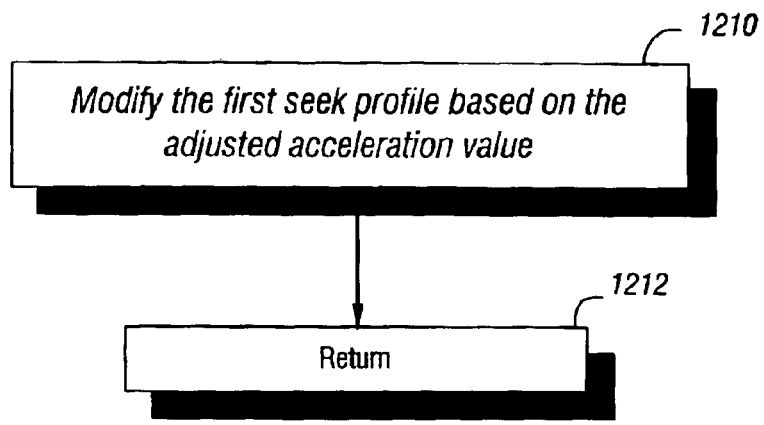

FIG. 12A, in conjunction with FIG. 3B, illustrates the application of the adjusted acceleration value to the seek profile 330. As shown, the process begins in block 1210 where the seek profile 330 is modified to a seek profile 370 based on the adjusted acceleration value received from the acceleration processor 220 via signal 285 as shown in FIG. 2A. Suitably, the seek profile 330 is initially determined based on an initial acceleration value determined prior to start of the recording process in block 410 of FIG. 4, and thereafter modified to a seek profile 370 according to the adjusted calculated acceleration values during the movement of the actuator 116. The process flow then proceeds to block 1212 for returning to block 420 of FIG. 4.

Figure 12B:
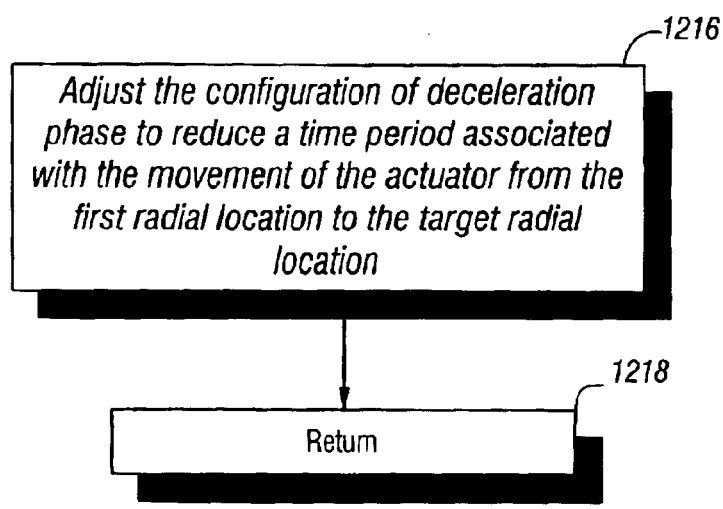

FIG. 12B in conjunction with FIG. 3B, further illustrates the process used in block 1210 of FIG. 12A. As shown, the process begins in block 1216, where the configuration of deceleration phase 334 is adjusted to reduce a time period associated with the movement of the actuator 116 from the first radial location to the target radial location. One advantage of the foregoing feature of the present invention over the prior art is that by calibrating the current applied to VCM 122 on the fly and adaptively adjusting the seek profile 370 during each seek, maximum acceleration of the head 114 can be achieved while reducing the risk of head overshoot. In addition, since the relationship between the change in the current applied to the VCM 122 and the resulting change in torque output of the VCM 122 is reflective of the environmental temperature changes in the VCM 122, the foregoing process of the present invention provides a cost-effective solution to monitor the temperature variations in a disk drive without the need for incorporation of physical sensors therein.

As shown in FIG. 3B, an exemplary seek current profile 370 is generated by the foregoing processes of the present invention and compared to the traditional seek current profile 330 of FIG. 3A for which a conservatively predetermined maximum acceleration current that is considerably less than the actual saturation level was used by the compensator 286 (shown in FIG. 2A). The modified seek current profile 370, however, achieves a shorter duration acceleration by maximizing the acceleration value used, so as to provide a faster seek operation than that of the traditional seek current profile 330. As shown in FIG. 3B, the available range of current 366 comprises a range of current magnitudes between an acceleration saturation current level 344 and deceleration saturation current level 346. The current profile 370 reaches a maximum deceleration magnitude 376 aided by back-emf boost 372 and efficient use of available current 374. Thus, deceleration phase 382 of the seek operation is able to advantageously complete the seek operation at time T3 that is less than T4, the time required to complete the same seek operation using the traditional current profile 380. Returning to FIG. 12B, the process flow then proceeds to block 1218 for returning to block 1210 of FIG. 11A.

Figure 2B:
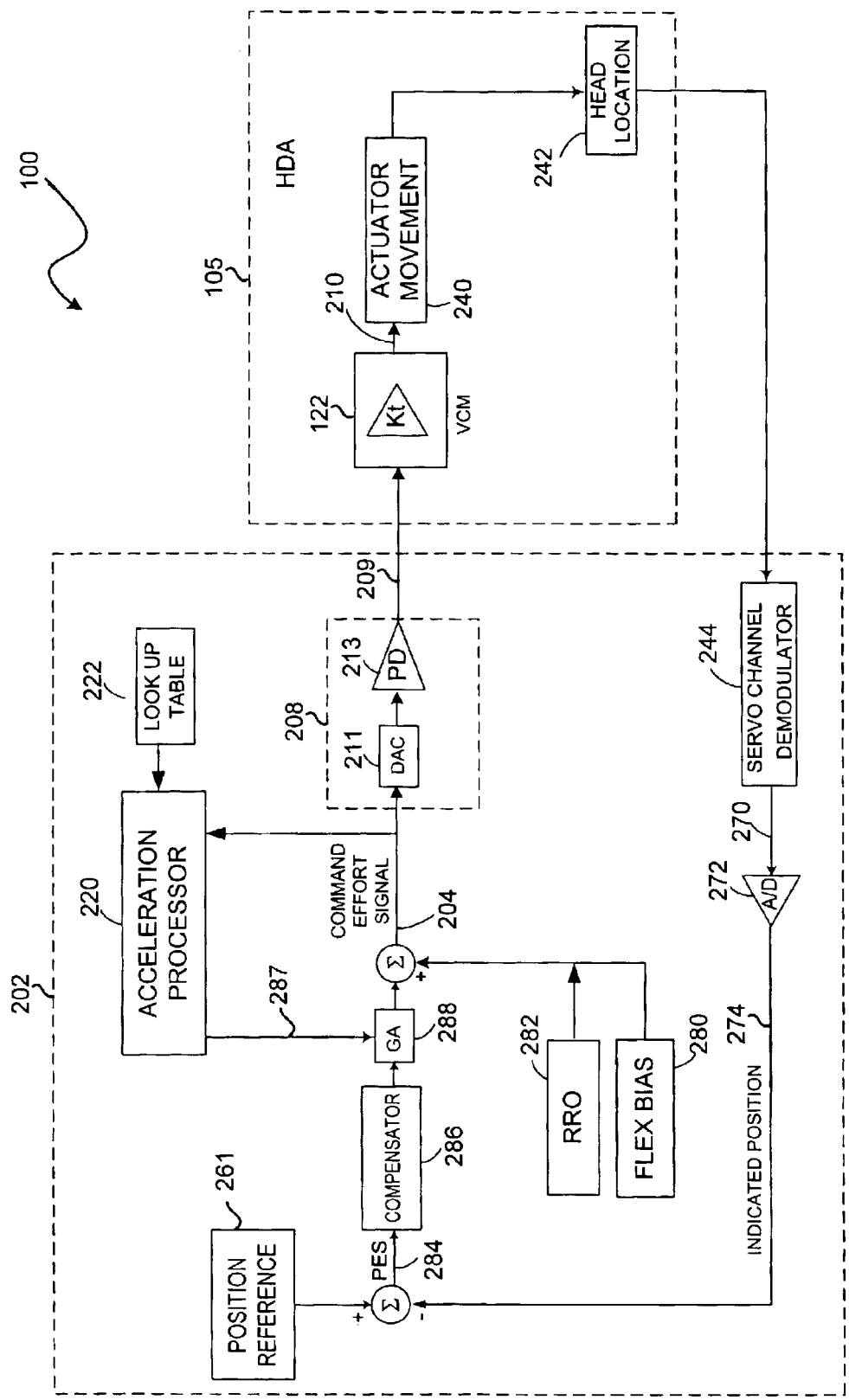

In another aspect of the present invention, as shown in conjunction with FIG. 2B a second acceleration value may be calculated for use in subsequent track-follow operations for regulating the track-follow bandwidth. The second acceleration value can be used to provide the servo control system 202 with inferred visibility as to the variations in the motor torque parameter (Kt) of VCM 122.

FIG. 2B illustrates a diagram of an exemplary servo system 200 in a disk drive 100 in which the method of the present invention for improving the performance of a rotary actuator 116 in a disk drive 100 during a track-follow operation may be practiced. As shown in FIG. 2B, the rotary actuator 116 (shown in FIG. 1) comprises a voice coil motor (VCM) 122 characterized by a torque output parameter 210. The disk drive 100 further comprises a servo control system 202 having a motor driver circuit 208 for receiving a series of command effort signals 204. Suitably, the motor driver circuit 208 comprises a digital to analog converter (DAC) 211 and a power driver (PD) 213, such as a power driver circuit. The motor driver circuit 208 provides an operating current 209 to the VCM 122 based on the command effort signals 204 for causing an actuator movement 240, which in turn causes adjustments to he head location 242 to maintain the head 114 over a desired servo track 106. Suitably, the head location 242 is concurrently monitored by a servo channel demodulator 244 which outputs an analog signal 270 corresponding to the head location 242 that is typically converted to a digital signal 274 by an analog to digital converter (ADC) 272. The digital signal 274 corresponds to an indicated track position and off-track percentage value. The digital signal 274 is then combined with a signal corresponding to a position reference 261 to generate a position error signal 284 that is then generated and fed into the compensator 286 which determines the command effort signals 204. During the track-follow operations, the compensator 286 functions as a position control compensator. The series of command effort signals 204 are then transmitted based on a gain adjustment 288 as described below and in greater detail in conjunction with FIGS. 13A–B.

As described below, the foregoing processes of the present invention shown in FIGS. 4–11C may be substantially applied to calculating the second acceleration value, with the following differences:

In FIG. 5, for track-follow operations, the threshold value now corresponds to a current that is less than a saturation current of the motor driver circuit 208, as shown by the threshold value T2 in FIG. 3A wherein T2 is less than T1. In FIG. 7, the same process for seek operations is applied but now based on the threshold value T2. Thus, in block 710 the last command effort signal 204 transmitted prior to the command effort signal exceeding the threshold value T2 is stored by the acceleration processor 220. In FIG. 3A, for example, command effort signal 204a is the last command effort signal 204 transmitted prior to the command effort signal exceeding the threshold value T2. Next, in block 712, a subset of the command effort signals 204 transmitted following the command effort signal exceeding the threshold value is stored, wherein each command effort in the subset exceeds the threshold value T2. Suitably, each command effort signal in the subset is of a value corresponding to a current that is less than the saturation current. The subset of command effort signals comprises a predetermined number of command effort signals, suitably three command effort signals for the track-follow operations. In FIG. 3A, an exemplary subset of the command effort signals 204 transmitted following the command effort signal 204a (which exceeded the threshold value) comprises three command effort signals 204b, 204c, and 204d, wherein as shown, each of the three command effort signals in the subset exceeds the threshold value T2. Next, the process flow then proceeds to block 714 for returning to block 414 of FIG. 4. The overall process flow then proceed to block 416 of FIG. 4 as described above.

In FIG. 8, for the track-follow operations, the process begins in block 810 where an initial velocity of the moving actuator 116 corresponding to the first-transmitted command effort signal 204 in the subset of the command effort signals following the exceeding of the threshold value T2 is determined by the acceleration processor 220. In FIG. 3A, the first-transmitted command effort signal 204 in the subset of the command effort signals following the exceeding of the threshold value T2 is that of command effort signal 204b. The velocity of the moving actuator 116 corresponding to command effort signal 204b is then determined. Next, in block 812, a final velocity of the moving actuator 116 corresponding to the most recently transmitted command effort signal 204 in the subset of the command effort signals is also determined. In FIG. 3A, the most recently transmitted command effort signal 204 in the subset of the command effort signals is that of command effort signal 204d. The velocity of the moving actuator 116 corresponding to command effort signal 204d is then determined. Next, the process flow then proceeds to block 814 for returning to block 416 of FIG. 4. The overall process flow then proceed to block 418 of FIG. 4 as described above.

In FIG. 9, for the track-follow operations, the calculation of a second acceleration value is then performed as described above in conjunction with the seek operations but using the different track following values obtained based on the threshold value T2. The second acceleration value is then adjusted in the manner described in conjunction with the the track follow operations of FIGS. 10 and 11A–C.

Figure 13A:
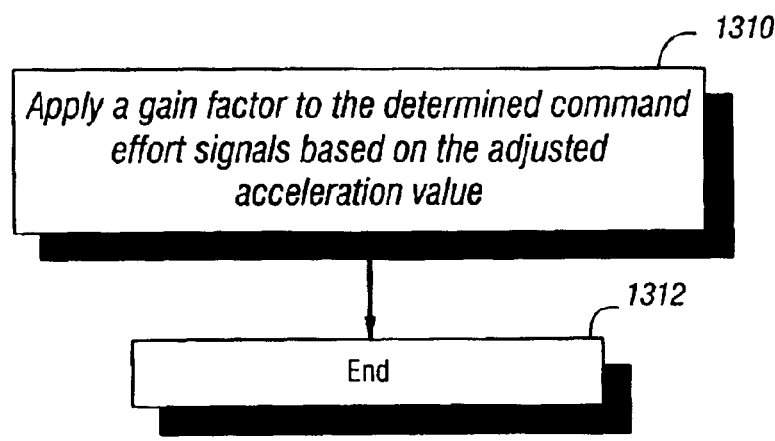

FIG. 13A, in conjunction with FIG. 2B, illustrates another process used in the embodiment of the invention shown in FIG. 4 for track-follow operations. As shown in FIG. 2B, the servo control system 202 comprises a compensator 286 for determining command effort signals during track-follow operations and a gain adjust (GA) module 288 for receiving the command effort signals and a gain factor signal 287 from the accleration processor 220. The process in FIG. 13A begins in block 1310 where the gain factor is applied to the determined command effort signals based on the adjusted second acceleration value obtained for the track follow-operations by the the accleration processor 220. The flow then proceeds to block 1312 where the process ends.

Figure 13B:
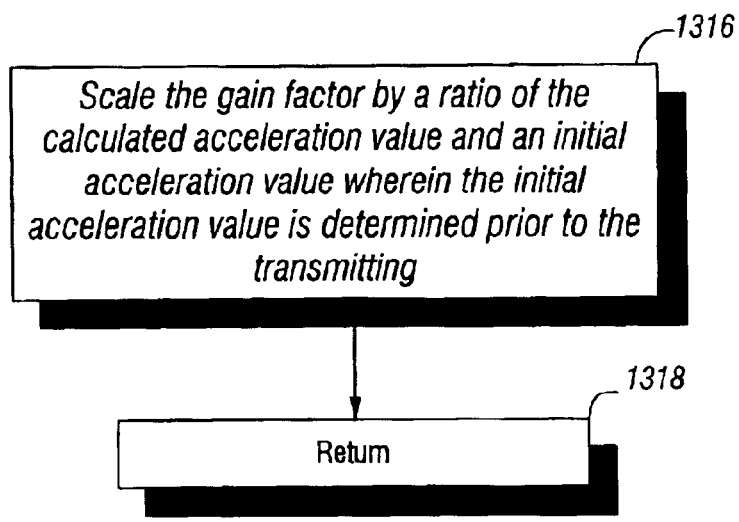

FIG. 13B in conjunction with FIG. 2A, further illustrates the process used in block 1310 of FIG. 13A. The process in FIG. 13B begins in block 1316 where the gain factor is scaled by a ratio of the calculated acceleration value and an initial acceleration value wherein the initial acceleration value is determined prior to the recording. Suitably, the gain adjust (GA) module 288 is configured to perform the process of FIGS. 13A–B.

One advantage of the foregoing feature of the present invention over the prior art is that by adaptively regulating the track-follow bandwidth to reduce the risk of off-track head position, the movement-related performance of the head 114 during track-follow operations can be improved.

It should be noted that the various features of the foregoing embodiment were discussed separately for clarity of description only and they can be incorporated in whole or in part into a single embodiment of the invention having all or some of these features.

What is claimed is:

1. A method for improving the performance of a rotary actuator in a disk drive, the rotary actuator comprises a voice coil motor (VCM) characterized by a torque parameter, the disk drive comprises a servo control system having a motor driver circuit for receiving a series of command effort signals transmitted based on a first seek profile, and for providing an operating current to the VCM based on the command effort signals for causing a movement of the actuator from a first radial location to a target radial location, the method comprising:

recording the series of transmitted command effort signals, and while the actuator is moving:
adjusting each recorded command effort signal to account for at least one disk drive influence on the actuator movement;
storing the adjusted command effort signals;
monitoring the velocity of the moving actuator;
calculating an acceleration value corresponding to the moving actuator from the stored command effort signals and the monitored velocity; and
adjusting the acceleration value to account for a radial torque parameter variation.

2. The method as defined in claim 1, wherein the recording further comprises:
comparing each command effort signal to a threshold value; and
determining if the compared command effort signal exceeds the threshold value.

3. The method as defined in claim 2, wherein the storing further comprises:
storing the last command effort signal transmitted prior to the command effort signal exceeding the threshold value; and
storing a subset of the command effort signals transmitted following the command effort signal exceeding the threshold value wherein each command effort in the subset exceeds the threshold value.

4. The method as defined in claim 3, wherein the monitoring further comprises:
determining an initial velocity of the moving actuator corresponding to the first-transmitted command effort signal in the subset of the command effort signals following the exceeding of the threshold value; and
determining a final velocity of the moving actuator corresponding to the most recently transmitted command effort signal in the subset of the command effort signals.

5. The method as defined in claim 4, wherein the calculating further comprises:
calculating a velocity differential between the determined initial velocity and the final velocity;
performing a summation of the stored subset of command effort signals and generating a summation result;
subtracting a first value corresponding to a selected command effort signal in subset of the command effort signals from a second value corresponding to the last command effort signal transmitted prior to the command effort signal exceeding the threshold value, and generating a subtraction result;
multiplying the subtraction result by a VCM-delay value and generating a multiplication result;
adding the multiplication result to the summation result and generating an addition result; and
dividing the velocity differential by the addition result and generating a first division result wherein the calculated acceleration value comprises the first division result.

6. The method as defined in claim 5, wherein the VCM-delay value is a normalized VCM-delay value of 0.5.

7. The method as defined in claim 5, further comprising: modifying the first seek profile based on the adjusted acceleration value.

8. The method as defined in claim 7, wherein the movement of the actuator comprises an acceleration phase followed by a deceleration phase.

9. The method as defined in claim 8, wherein the calculating occurs during the acceleration phase.

10. The method as defined in claim 9, wherein modifying the first seek profile comprises:
adjusting the configuration of deceleration phase to reduce a time period associated with the movement of the actuator from the first radial location to the target radial location.

11. The method as defined in claim 10, wherein the threshold value corresponds to an approximate saturation current of the motor driver circuit.

12. The method as defined in claim 11, wherein the subset of command effort signals comprises a predetermined number of command effort signals.

13. The method as defined in claim 12, wherein the predetermined number of command effort signals is six.

14. The method as defined in claim 5, wherein the servo control system comprises a compensator for determining command effort signals during track-follow operations.

15. The method as defined in claim 14, further comprising:
applying a gain factor to the determined command effort signals based on the adjusted acceleration value.

16. The method as defined in claim 15, further comprising:
scaling the gain factor by a ratio of the calculated acceleration value and an initial acceleration value wherein the initial acceleration value is determined prior to the recording.

17. The method as defined in claim 16, wherein the threshold value corresponds to a current less than a saturation current of the motor driver circuit.

18. The method as defined in claim 17, wherein the subset of command effort signals comprises a predetermined number of command effort signals.

19. The method as defined in claim 18, wherein the predetermined number of command effort signals is three.

20. The method as defined in claim 1, wherein the adjusting the acceleration value further comprises:
obtaining a value corresponding to the radial torque parameter variation; and
adjusting the calculated acceleration value based on the obtained value.

21. The method as defined in claim 20, wherein the value corresponding to the radial torque parameter variation is obtained from a look up table.

22. The method as defined in claim 1, wherein the motor driver circuit comprises a digital to analog converter (DAC).

23. The method as defined in claim 1, wherein the first seek profile is determined based on an initial acceleration value determined prior to the recording.

24. The method as defined in claim 1, further comprising:
reducing the effects of noise-induced deviations in the adjusted acceleration value.

25. The method as defined in claim 24, wherein the reducing further comprises:
applying a slew rate limit to the adjusted acceleration profile.

26. The method as defined in claim 25, wherein the reducing further comprises:
applying a low-pass filter to the adjusted acceleration profile.

27. The method as defined in claim 1, wherein the disk drive influence is caused by a flex bias of a cable connecting the rotary actuator to the servo system and wherein the adjusting each command effort signal further comprises filtering a flex bias feed forward component from the command effort signal.

28. The method as defined in claim 1, wherein the disk drive comprises a disk having a plurality of recorded servo tracks and wherein the disk drive influence is caused by a variation in the position of a recorded servo track and wherein the adjusting each command effort signal further comprises filtering from the command effort signal a component corresponding to the variation in the position of the recorded servo track.

* * * * *